Jan. 2, 1940.  C. P. CROCO  2,185,836
TENSION CONTROL SYSTEM
Filed Feb. 28, 1935  3 Sheets-Sheet 1
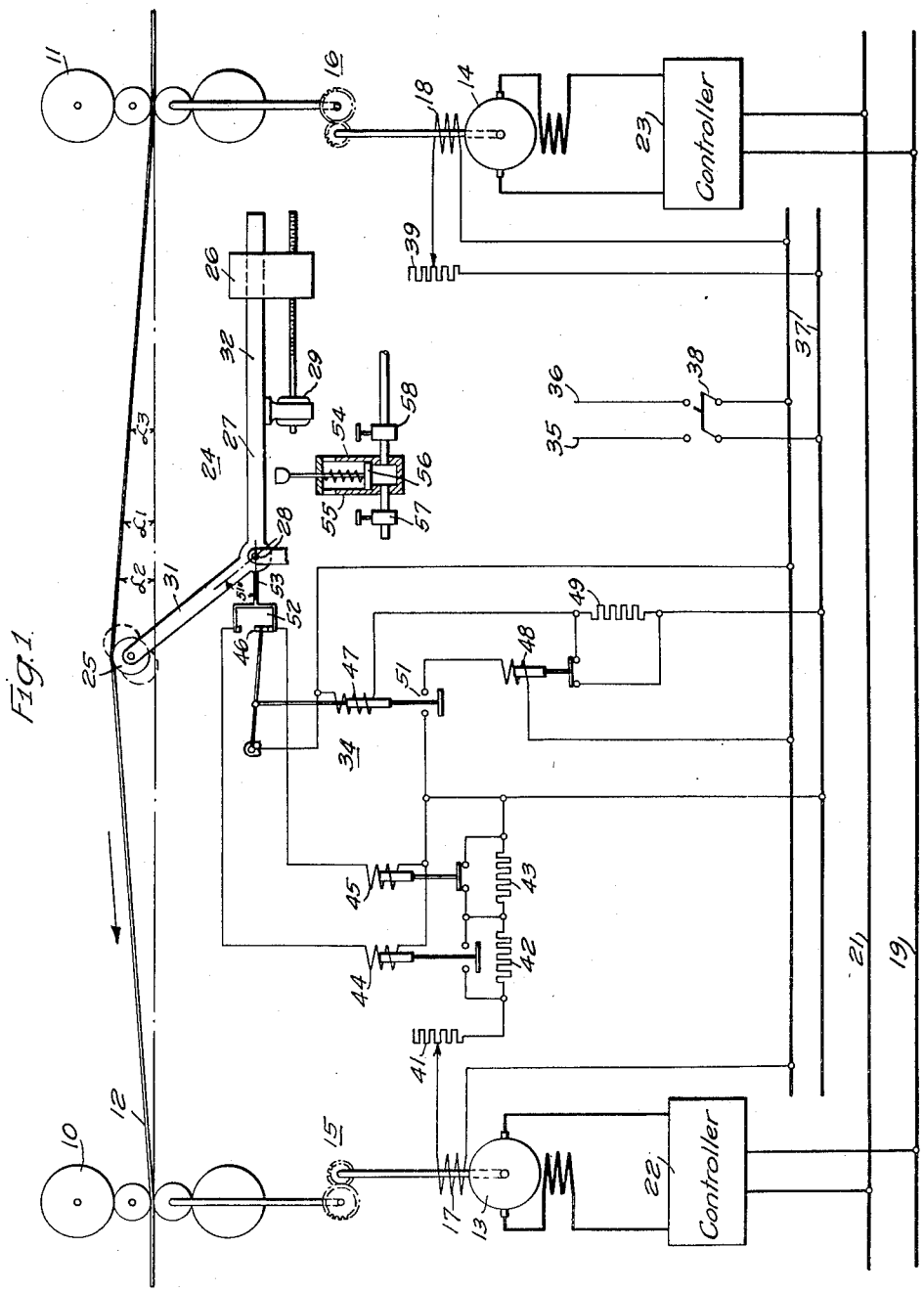
WITNESSES:
INVENTOR
Charles P. Croco.
ATTORNEY

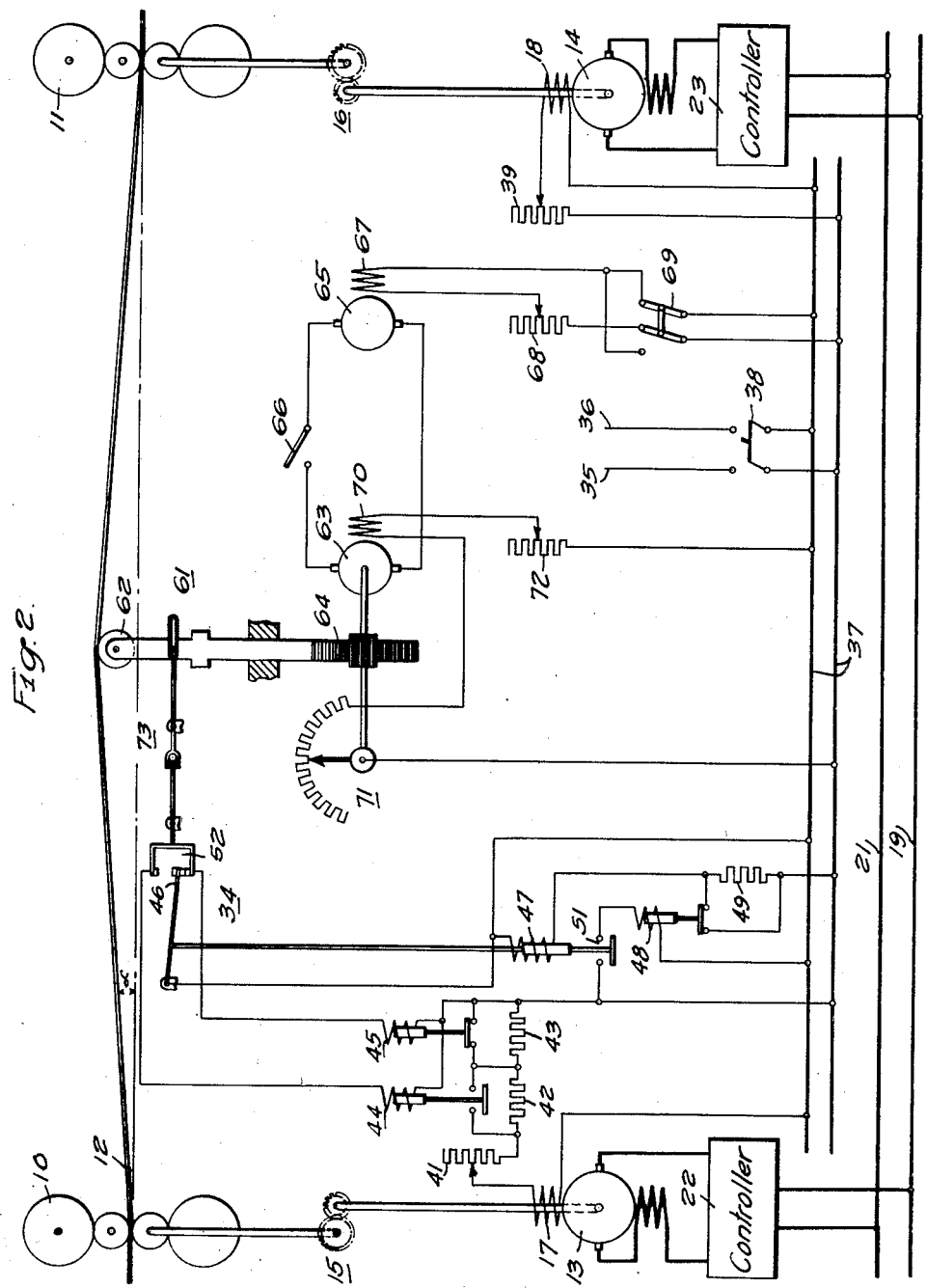

Jan. 2, 1940.  C. P. CROCO  2,185,836
TENSION CONTROL SYSTEM
Filed Feb. 28, 1935  3 Sheets-Sheet 3
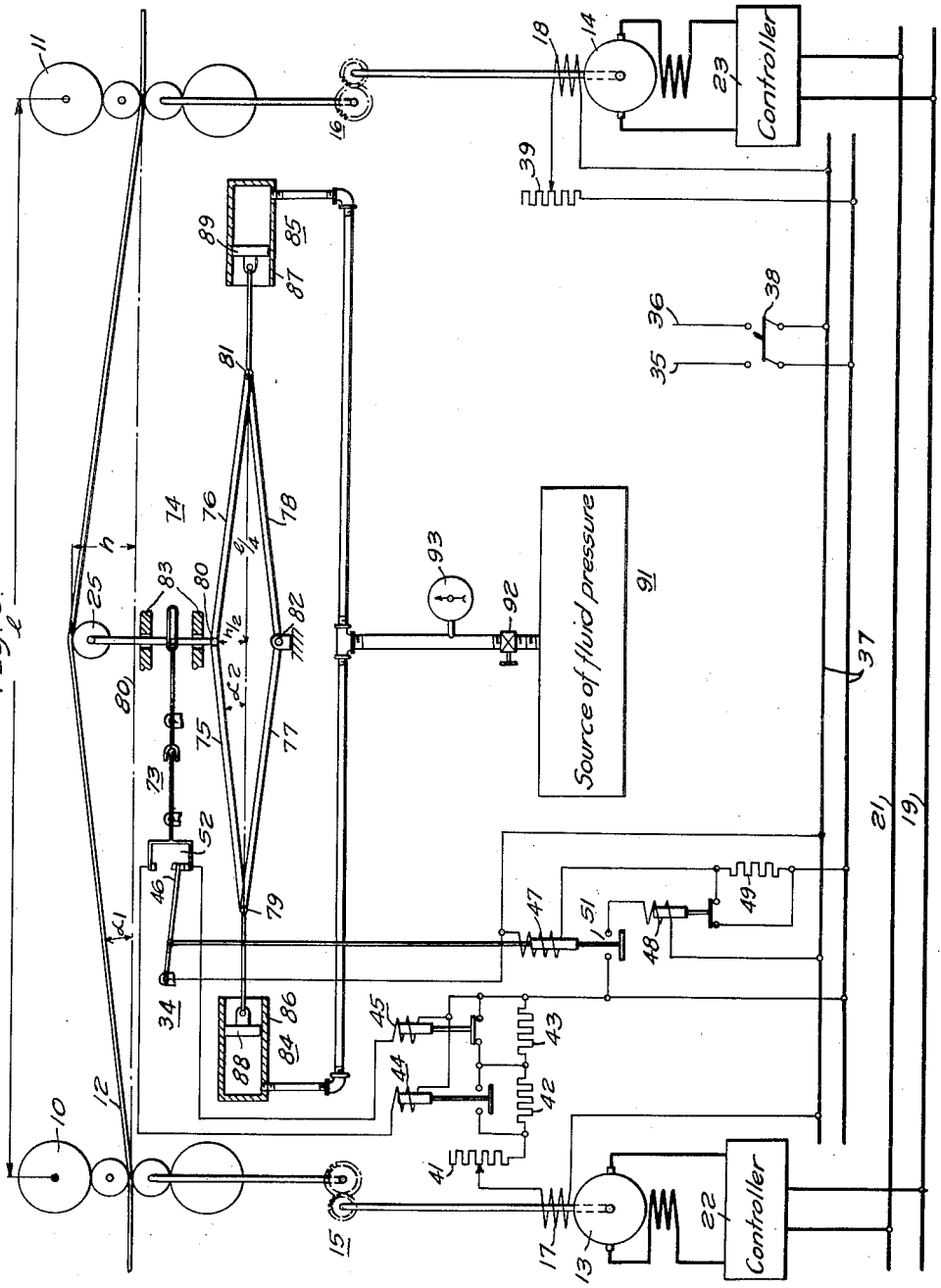
WITNESSES:  INVENTOR
  Charles P. Croco.
  BY
  ATTORNEY Patented Jan. 2, 1940

2,185,836

UNITED STATES PATENT OFFICE 2,185,836

TENSION CONTROL SYSTEM

Charles P. Croco, Pittsburgh, Pa., assignor to Westinghouse Electric & Manufacturing Company, East Pittsburgh, Pa., a corporation of Pennsylvania Application February 28, 1935, Serial No. 8,781

18 Claims. (Cl. 80—35)

My invention relates, generally, to control systems, and, more particularly, to a system for automatically maintaining a predetermined tension on the material being worked upon or handled by a plurality of work devices.

In the operation of various kinds of mills and work devices in general, it is desirable to maintain a predetermined constant tension on the material extending between the various work devices, such, for example, as between the rolls stands of a tandem or continuous mill or between a plurality of work devices of any kind. It has formerly been the practice in cases of this kind to attempt to control the tension on the material in a more or less indirect manner either by causing the motors driving the roll stands in the case of a mill to assume a load somewhat greater than that required to actually reduce the material as it is passed through the rolls, the excess load being the tension load, or to so influence the operation of the work devices or material handling devices so as to subject the material to a tension.

While this method of control is effective to maintain some kind of tension on the material, it has been found to be inadequate, since it is difficult, if not impossible, to determine the amount of tension that is being applied, since there is no way in which to determine what part of the motor load is being utilized in producing tension, when both tension and reduction loads are being supplied by the same motor or to otherwise control the work device so as to control the tension.

Furthermore, the amount of power required for working the material may vary from time to time which causes the tension to vary, since it is impossible to provide a control for the motor in the form of a constant-current regulator or the like which so functions as to hold a constant tension load, regardless of variations in the working load.

It is, therefore, the object of my invention, generally stated, to provide a means for controlling and maintaining tension on translatory material being worked or handled, which shall overcome the foregoing disadvantages of the prior art systems and devices, and which shall be simple and inexpensive to manufacture and install and which will function to accurately maintain any desired tension on the material, regardless of other conditions entering into the operations.

A more specific object of my invention is to provide for controlling the tension on traslatory material by applying a force directly to the material between work devices.

A further object of my invention is to provide for subjecting material extending between two work devices to a tension by means of a transverse force which automatically varies throughout a predetermined range in proportion to the degree of deflection of the material from its otherwise normal path of travel.

A further object of my invention is to provide for applying a tension to material extending between work devices by subjecting it to a transverse force, deflecting it from its normal path and automatically controlling the length of material between the work devices so as to maintain the amount of deflection as nearly constant as possible.

Another object of my invention is to provide for subjecting material between work devices to a tension by means of a device for applying a transverse deflecting force to the material and utilizing the movements of the force-applying device for maintaining the length of material between the work devices within predetermined limits and thereby the position of the force-applying means within a predetermined operating range.

A still further object of my invention is to provide for subjecting a material, extending and being worked by a plurality of work devices to a tension by means of an idler roller mechanism disposed to apply a force transverse to the path of movement of the material which varies in accordance with the degree of deflection of the material between predetermined limits of movement and which is maintained within said predetermined limits of movement by rendering the speed or other operation of one of the work devices responsive to the movements of the idler roller.

Another object of my invention is to provide a tensioning device for material extending between work devices which is inherently adapted to maintain a substantially constant tension on the material over a predetermined operating range corresponding to a predetermined range of deflection of the material from its normal path of movement.

These and other objects of my invention will become apparent from a reading of the following description in conjunction with the drawings, in which Figure 1 is a diagrammatic view of one embodiment of the invention, Fig. 2 is a diagrammatic view of another embodiment of the invention, and, Fig. 3 is a diagrammatic view of still another embodiment of the invention.

It will be readily understood that the invention may be applied in any instance where it is desired to subject a material extending between various kinds of work devices to a tension, however, in this instance, it will be described in connection with a rolling mill commonly known as a tandem mill.

In practicing my invention as it is applied to a rolling mill where it is desired to maintain a predetermined tension on the material between any two roll stands, the material is subjected to a transverse force at a point between the roll stands by means of an idler roller mechanism which is inherently adapted to automatically vary the transverse force applied to the material over a predetermined range of operation on deflection of the material in such manner as to maintain a substantially constant tension on the material. The idler roller mechanism may take any one of several forms such, for example as a roller actuated by a torque motor, a roller mounted upon a weight-actuated lever system having predetermined characteristics or a roller actuated by a compound lever system which is force actuated.

So long as the position of the roller is maintained within its predetermined operating range, the tension on the material will remain substantially constant and is not affected or varied in any way by the reduction being made in the thickness of the material by the mill stands.

The position of the roller is so controlled as to maintain it within its predetermined operating range by controlling the speed of one of the roll stand driving motors by means of a regulator which is controlled by the movements of the tensioning device. If the roller moves upwardly or downwardly from its normal position, the regulator functions to change the motor speed in such a way as to vary the length of the material between the roll stands to such an extent as to force the roller downwardly or upwardly, as the case may be, to its normal position.

Referring now to Fig. 1 of the drawings, there is disclosed one concrete embodiment of my invention as may be applied for maintaining tension between the roll stands of a tandem or continuous mill.

In this instance, the mill comprises roll stands 10 and 11 through which a piece of material 12, usually in the form of a strip, is passed and is worked upon simultaneously by both roll stands as it is passing therethrough. The roll stands 10 and 11 may be driven in any suitable manner, such, for example, as by means of motors 13 and 14, respectively, coupled to their respective roll members by means of suitable gear sets 15 and 16. As illustrated, the roll motors 13 and 14 have separately-excited shunt field windings 17 and 18, respectively. The motors may be operated from any suitable source of direct-current power, such as may be illustrated by conductors 19 and 21, the motors being connected thereto by any suitable type of starting devices 22 and 23.

As set forth hereinbefore, the usual method of operating mills of this type is to provide each motor with a current regulator or similar device in order that a tension may be maintained on the material between roll stands by causing each motor to assume a greater load than that required to reduce the material and thereby exert a pull upon the material. In other words, a motor driving each roll stand was subjected to a load having two components, one resulting from the power required to drive the rolls in reducing or working the material and the other resulting from the power required to subject the material to a tension. It is apparent, therefore, that when a current regulator or the like is used in order to control tension there is no way of determining which part of the total load on the motor results from the tension load, and, therefore, it is extremely difficult to regulate the tension with any degree of accuracy.

In this instance, provision is made for controlling and maintaining a substantially constant tension on the material extending between the roll stands independently of the load conditions resulting from the power required to reduce or otherwise work the material.

In order to provide for maintaining a substantially constant tension on the material, there is utilized a tensioning device for exerting a transverse deflecting force on the material between the roll stands 10 and 11. If, as shown in the drawings, a deflecting force is applied to the material 12 midway between the two stands, such as to move it from the plane of the straight pass line extending between the roll stands to a deflected position, as is shown in full lines, the tension on the material will be a function of the sine of the angle alpha 1, and so long as the strip is maintained in this position under a constant force, the tension will remain substantially constant.

In the event, however, that the length of the material between roll stands increases and the same constant deflecting force is applied, the angle of deflection becomes greater corresponding to alpha 2, and, therefore, the tension on the material is reduced, since the sine of the angle alpha 2 is greater. The reverse is true in the event that the length of the material between the roll stands decreases, since the sine of alpha 3 is less than that of alpha 1, which causes the tension on the material to increase.

In view of the foregoing, it will be readily understood that in order to constantly maintain a predetermined tension on the material, provision must be made for not only maintaining the tensioning means which applies the force to the material as near as possible to a predetermined position, but provision must also be made for causing a variation to occur in the amount of force produced by the tensioning means depending upon the degree of deflection of the material from its normal path of travel.

While these results may be accomplished in a number of different ways, the tensioning device shown generally at 24 in Fig. 1 has been found to be one satisfactory way of obtaining the desired results. The device 24 comprises a tension roller 25, which is disposed to engage the material 12 and a weight 26, both of which are mounted upon a bell-crank device 27. The bell-crank device 27 is pivotally mounted at 28 in order that the weight 26 may be utilized to urge the roller 25 upwardly against the material. The force exerted by the roller 25 when in any given position is determined by the position of the weight 26, which is adjustably mounted upon the horizontal arm 27 of the bell-crank device and may be adjusted in position by any suitable means, such, for example, as the motor-operated screw 29.

It will also be understood that the force may be applied to the roller 25 by means of a weight acting on a lever arm of constant or fixed length and the weight changed to vary the maximum force obtainable which is the full equivalent of the device 24 illustrated.

In order that the tensioning device 24 may inherently function to maintain the tension substantially constant over a maximum range of operation or deflection of the material, the arm 31 which carries the roller 25 should be positioned at an angle of approximately 51 degrees from the plane through the pivot 28 parallel to the normal pass line or horizontal or, in this instance, from the weight arm 32, as shown. This arrangement or design causes the tensioning device to be self-compensating over a maximum range of operation and permits a limited amount of movement of the roller 25, resulting from variations in the length of material between the roll stands, without appreciably changing the tension on the material. The transverse or deflecting force exerted upon the material by the roller 25 is thereby automatically varied in accordance with the position of the roller in such manner as to maintain the material under a substantially constant tension.

It is apparent that when the roller 25 moves upwardly, which requires a greater vertical force in order to maintain the tension substantially constant, the distance between the vertical planes extending between the pivot point 28 and the center of the roller 25 is decreased, which causes an increase in the deflecting force. Likewise, when the roller 25 is depressed to a position below normal, the distance between these same two points is increased, which correspondingly reduces the deflecting force in such proportion as to still maintain a substantially constant tension.

While the tensioning device 24 may, when used alone, satisfactorily maintain the tension over a predetermined operating range, much better results will be obtained, if provision is made for constantly maintaining the tensioning device in as near a predetermined operating position as possible.

One way in which to do this is to control the speed of at least one of the roll stand motors in accordance with the movements of the tensioning device 24 in such manner that, should the deflection of the material vary from a value considered as normal the speed of at least one of the motors is varied in order to take up the excess length in the strip to increase its length as the case may be.

In this instance, provision is made for automatically controlling the speed of the motor 13 by means of a regulator device 34, the functioning of which is caused to be influenced in accordance with the position of the tensioning device 24.

The separately-excited field windings 17 and 18 of the motors may be energized from any suitable source of excitation illustrated by conductors 35 and 36; which may be connected to the excitation bus 37 by means of a switch 38.

The field circuit of motor 14 is provided with a variable resistance 39, which may be used to adjust the speed of the roll stand 11. Likewise, the motor 13 is provided with a field rheostat 41 which may be used to adjust the speed of roll stand 10. In addition, however, the field circuit of motor 13 contains resistors 42 and 43 which are controlled by shunting switches 44 and 45.

While the regulator 34 has been illustrated as a vibrating type, it will be understood that any other suitable type of regulator may be used. The vibrating contact element 46 is operated in a well known manner by means of the electromagnet 47 and auxiliary relay 48. When the excitation bus 37 is energized, the electromagnet 47 is energized and raises the contact element 46 to its upper position. The energizing circuit for the electromagnet 47 contains a resistor 49 which is shunted by the auxiliary relay 48. Upon the operation of the electromagnet 47, its contact members 51 close to energize the auxiliary relay 48, which opens its contact members to render the resistor 49 effective. This increases the resistance of the circuit of the electromagnet 47 to such an extent as to cause the contact element 46 to return to its lower position. This cycle is repeated over and over again, thereby causing the contact element 46 to vibrate.

The regulator is provided with an adjustable contact element 52, having upper and lower contacts, which is positioned in any suitable manner in accordance with the position of the tensioning device 24. As shown, the contact element 52 is connected directly to the bell-crank device 27 by means of a flexible connector 53. However, it is to be understood that this is merely illustrative and that the movements of the tensioning device may be transmitted to the contact element 52 in any other suitable manner.

In order to more clearly describe the functioning of the regulator 34 to control the speed of the motor 13 in accordance with the movements of the tensioning device 24, it will be assumed that the material 12 is travelling in the direction indicated by the arrow. Under this condition the speed of the motor 13 must be increased when the deflection increases and decreased when the deflection decreases.

When the vibrating contact element 46 is in its lower position, it engages the lower contact of the adjustable contact element 52 and the shunting relay 45 is energized to remove the shunt connection from the field resistor 43, thereby decreasing the excitation of the motor 13 and increasing its speed accordingly. When the contact element 46 is in its upper position, the shunting relay 44 is energized to bridge resistor 42, thereby increasing the excitation of the motor which causes its speed to decrease.

The regulator 34 is so arranged that when the tensioning device 24 is in its normal position, the vibrating contact element 46 makes contact with the upper and lower contacts of the adjustable contact element 52 for equal periods of time. If, however, the deflection in the material 12 increases, the adjustable contact element 52 of the regulator is so positioned that the vibrating element 46 engages the lower contact of the contact element 52 for a greater time than it engages the upper contact, thereby causing the shunting switch 45 to be maintained in its open position over longer periods of time than the shunting switch 44, which causes the speed of the motor 13 to increase a sufficient amount to reduce the deflection to normal.

The reverse is true when the deflection decreases. This causes the shunting switch 44 to be maintained energized over longer periods of time than switch 45, thereby causing the speed of the motor to be decreased and the deflection increased.

It will be readily understood that any of the well known forms of anti-hunting means may be applied to the regulator in the event that such becomes necessary for any reason.

In order to provide for controlling the movements of the tensioning device 24 when it is not supported by the material 12, there is provided a hydraulic device 54 comprising a cylinder 55 and piston 56 which may be controlled by fluid pressure in a well known manner by means of valves 57 and 58.

Referring now to Fig. 2 of the drawings, it will be observed that in this embodiment of the invention the system as a whole is generally the same as that of Fig. 1, corresponding parts being indicated by like reference numerals, with the exception that the tensioning device takes a different form.

In this instance the tensioning device 61 comprises an idler roller 62 which is forced against the material by means of a torque motor 63 connected thereto by means of a suitable gear 64, as shown.

The torque motor 63 may be supplied with power from any suitable source such for example as the generator 65 connected thereto through a switch 66, the generator being driven in any suitable manner. The generator 65 is provided with a field winding 67 connected to the source 35—36 through a field rheostat 68 and a reversing switch 69. The rheostat 68 may be used to vary the generator voltage to control the load current of the torque motor while the direction of operation of the torque motor may be controlled by the reversing switch 70.

In order that the tensioning device 61 may so function as to vary the transverse deflecting force in accordance with the degree of deflection of the material within a predetermined range, the excitation of the field winding 70 of the torque motor is varied in accordance with the position of the roller 62 within the predetermined range of movement or deflection.

As in the case of the tensioning device 24 of Fig. 1, when the deflection of the material increases the angle alpha increases and the transverse force exerted by the roller 62 must increase accordingly to maintain the tension at a substantially constant value.

Likewise when the degree of deflection decreases the angle alpha decreases and the transverse force must decrease to such a degree as to still maintain a substantially constant tension.

In this instance, this function is accomplished by means of a rheostat 71 actuated in accordance with the movements of the roller 62 and connected in series with the field winding 70 and manual rheostat 72 to the source 35—36.

As will be readily understood, the rheostat 71 may be so calibrated that for every position of the roller 62, within its predetermined range of operation, the excitation of the torque motor 63 will be such as to produce the necessary value of transverse force as to hold the tension on the material 12 substantially constant. The amount of tension to which the material is subjected may be controlled in this instance by varying the voltage of generator 65 to regulate the load on the torque motor, the maximum force exerted by the torque motor varying in accordance with the load current.

In this embodiment the regulator functions in the same manner as in the case of Fig. 1, the movable contact 52 being connected to the tensioning device 61 by means of a lever system 73 so that this contact moves in accordance with the movements of the roller 62. As in the case of Fig. 1, the connection of the regulator to the tensioning device is shown diagrammatically only as the particular manner in which it is connected is not a part of this invention and any suitable form of connection may be used.

As shown in Fig. 3, the transverse force may be produced by still another form of tensioning device 74 which may be referred to as a compound lever system. In this instance, the idler roller 25 is supported by levers 75 through 78 pivotally connected together at points 79, 80, 81 and 82. In this instance point 82 is fixed and point 80 moves in a vertical path and is guided in any suitable manner as by guides 83. This lever system may be actuated in any suitable manner to cause the idler roller 25 to apply the desired deflecting force to the material, such, for example, as by means of the devices 84 and 85 comprising cylinders 86 and 87 and pistons 88 and 89, respectively. The devices 84 and 85 may be controlled by any suitable fluid pressure the source of which is designated as 91 and the pressure which is applied to the devices 84 and 85 controlled by the valve 92. A gauge 93 is provided for indicating the pressure.

I have found that this form of tensioning device may be so constructed that it will, within a predetermined range of operation, automatically maintain a substantially constant tension on the material. In other words, it also is self-compensating throughout a predetermined range of operation or deflection of the material from the normal pass line. In order that this device be self-compensating over a maximum range of operation, the lever system 74 should be designed so that the distance from points 79 and 81 to the center of the toggle is L/4 where the distance between the roll stands is L as indicated. The distance from the points or joints 80 and 82 to the center of the toggle should be $h/2$ where $h$ is the amount of deflection of the material 12 from the straight pass line between the roll stands. Under these conditions the angle alpha 1 is substantially equal to alpha 2. The angle alpha 1 may vary from zero degrees to approximately 10 to 15 degrees without effecting an appreciable change in the tension on the material.

As will be readily understood the maximum transverse force and consequently, the tension on the material may be varied by varying the fluid pressure on the devices 84 and 85. In other words, the lever system is subjected to any desired constant force and automatically functions to vary the transverse force exerted by the idler roller 25, so that, as the deflection of the material from the normal pass line increases, the force is increased accordingly and, as the degree of deflection decreases as the slack in the material becomes less, the force is decreased accordingly, thereby holding the tension substantially constant.

As in the case of the systems of Figs. 1 and 2, one of the roll motors is controlled by a regulator which in turn is controlled by the movements of the idler roller 25 in order that the tensioning device 74 will be kept within its range of operation at all times. As shown the regulator contacts 52 are connected to the roller 25 in the same manner as in Fig. 2 so that they are at all times positioned with respect to their associated contacts 46 in accordance with the position of the roller 25.

In view of the foregoing it will now be apparent that I have provided for accurately maintaining a known tension on a material extending between separate work devices by the use of a tensioning device disposed to inherently maintain a substantially constant tension throughout a predetermined range of operation corresponding to a predetermined range of deflection of the material from the normal pass line through the work devices. Further, the movements of the tensioning device are utilized to so control the speed of one of the roll motors as to at all times maintain the slack in the material between the work devices such as to hold the tensioning device within its normal range of operation within which it is self-compensating or inherently operable to hold the correct tension on the material.

In all of the various forms of tensioning devices disclosed, a constant force, torque or power is applied to the device from an external source which may be controlled so as to change the tension, and a tensioning force derived therefrom which is automatically varied in amount as the degree of deflection of the material changes within predetermined limits. Therefore, it is to be understood that while the three embodiments of my invention have been illustrated as applied to a rolling mill there are other embodiments of and applications for my invention, all of which must embody the same general principle of operation as set forth hereinbefore, that is, of being inherently adapted to automatically hold a constant tension over a predetermined range and maintaining the device within its predetermined operating range at all times.

It is also to be understood that it is immaterial to the functioning of the invention which way from the normal pass line the deflection of the material occurs. It may be upwardly as illustrated in all the figures or downwardly. All that is required is that the material be deflected in some manner so as to subject it to a tension by means of an external transverse force which may be controlled.

Furthermore, while the tensioning device has been illustrated as being substantially midway between the work devices, it is to be understood that it may be positioned at almost any point without seriously interfering with its proper functioning.

It is evident from the foregoing that I have provided for controlling tension on material extending between work devices, regardless of the nature of the material or the work devices, in an accurate manner, thereby eliminating any guess work whatsoever on the part of the operator or user. The operator need only determine the tension required and adjust the tensioning device accordingly.

It may be stated in conclusion that while the illustrated example constitutes a practical embodiment of my invention, I do not wish to limit myself strictly to the exact details herein illustrated, since modifications of the same may be made without departing from the spirit of the invention as defined in the appended claims.

I claim as my invention:

1. In combination, means adapted to produce translatory motion of a length of material, means disposed to be actuated into engagement with the material to subject it to a transverse force and deflect it to an angular position with respect to its normal path of travel, means for actuating said means whereby the material is subjected to a transverse force which is automatically varied in accordance with the degree of deflection of the material within predetermined limits to maintain a substantially constant tension on the material, and means controlled by the actuating means for controlling the means for producing translatory motion of the material to maintain a substantially constant angular deflection within said predetermined limits of deflection.

2. In combination, means adapted to produce translatory motion of a length of material, tensioning means disposed to be actuated into engagement with the material to deflect it from its natural path of travel and subject it to a transverse force, a motor for actuating said tensioning means, and means for controlling the operation of the motor in accordance with the position of the tensioning means to cause the material to be subjected to a transverse force of varying magnitude dependent upon the degree of deflection of the material from its said natural path of travel.

3. The combination, with means adapted to produce translatory motion of a length of material, of tensioning means disposed to be actuated into engagement with the material to subject it to a transverse force, a compound lever system for supporting and actuating the tensioning means, said lever system comprising four levers of substantially equal length pivotally joined together at their ends in the form of a parallelogram, a fixed mounting for one pivotal joint of the lever system, the opposite joint thereof being connected to the tensioning means to actuate it transversely with respect to the path of movement of the material, and a fluid-pressure actuated device operatively connected with each of the other two opposite pivotal joints of the lever system for actuating said pivotal joints toward and away from each other to expand and contract the lever system, thereby, to produce a transverse movement of the tensioning means.

4. In combination, means adapted to produce translatory motion of a length of material, tensioning means operable to subject the moving material to a transverse force to tension said material, electro-responsive means for actuating the tensioning means, and means controlled in accordance with the movement of said tensioning means for controlling the energization of said electro-responsive means, whereby said electro-responsive means is rendered automatically operable over a predetermined operating range to cause the tensioning means to vary the magnitude of the transverse force to maintain a substantially constant tension on the material.

5. In combination, means adapted to produce translatory motion of a length of material, tensioning means operable to subject the moving material to a transverse force to tension said material, electro-responsive means for actuating the tensioning means, and regulating means controlled in accordance with the position of said tensioning means for controlling the operation of said electro-responsive means, whereby said electro-responsive means is rendered automatically operable over a predetermined operating range to cause the tensioning means to vary the magnitude of the transverse force to maintain a substantially constant tension on the material, and means responsive to the position of said tensioning means for controlling the means for producing translatory motion of the material thereby to maintain the electro-responsive means within said predetermined operating range.

6. In combination, means adapted to produce translatory motion of a length of material, means operable to subject the moving material to a transverse force to tension the material and deflect it to an angular position with respect to its normal path of travel, said means being inherently disposed to vary said transverse force to maintain a substantially constant tension on the material within a predetermined range of deflection of the material outside its otherwise normal path of travel, and means responsive to the movements of the force producing means for controlling the said translatory motion producing means to maintain the deflection of the material within said predetermined range, thereby to provide for subjecting the material to a substantially constant tension.

7. In combination, means adapted to produce translatory motion of a length of material, tensioning means disposed to be actuated into engagement with the material to subject it to a transverse force to tension said material, a motor for actuating said tensioning means, a source of power for the motor, means controlled in accordance with the position of the tensioning means for varying the excitation of the motor to vary the transverse force exerted upon the material by the tensioning means in accordance with the amount of deflection of the material, and means for controlling the power supplied to the motor by said power source to determine the amount of tension to which the material is subjected.

8. In combination, a plurality of spaced work devices, material extending between the work devices on which a substantially constant tension is to be maintained, tensioning means disposed to be actuated into engagement with said material to subject it to a transverse force to tension the material, a motor for actuating said tensioning means, means for supplying power to the motor, and means controlled in accordance with the position of the tensioning means for varying the excitation of the motor, thereby to vary the transverse force in accordance with the amount of deflection of the material.

9. In combination, a plurality of spaced work devices, material extending between the work devices on which a tension is to be maintained, tensioning means disposed to be actuated into engagement with said material to subject it to a transverse force to tension the material, a motor for actuating said means, means for supplying power to the motor, means controlled in accordance with the position of the tensioning means for varying the excitation of the motor, thereby to vary the transverse force in accordance with the amount of deflection of the material, and additional means controlled in accordance with the position of the tensioning means for controlling the relative speeds of the work devices.

10. In a system for maintaining a predetermined tension on material extending between a plurality of roll stands comprising, means for controlling the speed of one of said roll stands, means operable to subject the material between the roll stands to a transverse force to tension the material and deflect it to an angular position with respect to its normal path of travel, said means being disposed to automatically vary the transverse force in accordance with its operating position between predetermined limits to subject the material to a substantially constant tension, and means responsive to the operation of the tensioning means for controlling the operation of the speed controlling means, thereby to maintain the relative speeds of the roll stands such as to hold the tensioning device within its predetermined operating limits.

11. In combination, means adapted to produce translatory motion of a length of material, tensioning means operable to subject the material to a transverse force, a torque-motor for actuating the tensioning means, and means actuated in accordance with the movements of the tensioning means for controlling the excitation of the torque motor, whereby the force exerted by the torque motor is automatically varied in accordance with the position of the tensioning means over a predetermined range of movement.

12. In combination, means adapted to produce translatory motion of a length of material, tensioning means operable to subject the material to a transverse force, a torque motor for actuating the tensioning means, means actuated in accordance with the movements of the tensioning means for controlling the excitation of the torque motor, whereby the force exerted by the torque motor is automatically varied in accordance with the position of the tensioning means over a predetermined range of movement, and additional means responsive to the movements of the tensioning means for controlling the translatory motion of the material to maintain the tensioning means within said predetermined range of movement.

13. In combination, a plurality of spaced work devices for simultaneously working a piece of material extending therebetween, a motor for actuating each work device, self-compensating means for exerting a varying transverse thrust upon the material to subject said material to a substantially constant tension and deflect it from its normal path of travel and means including a voltage regulator responsive to the movements of said thrust exerting means for controlling the excitation of at least one of said motors, thereby to maintain a substantially constant length and deflection of the material between the work devices.

14. In combination, a plurality of spaced work devices disposed to simultaneously work a piece of material extending therebetween, a weight-actuated device positioned between the work devices disposed to subject the material to a transverse thrust to tension the material and deflect it out of its normal path of travel, said means being self-compensating over a predetermined range of angular movement of the material, and regulator means controlled in accordance with the position of the weight-actuated device within said predetermined range of movement for controlling the speed of at least one of said work devices, whereby the length of material and degree of deflection thereof between roll stands is controlled to maintain the weight-actuated device in a predetermined position.

15. In combination, a plurality of spaced roll stands for simultaneously rolling a piece of material extending therethrough, means for driving the roll stands, means including a roller positioned intermediate the roll stands for subjecting the material to a transverse force and thereby tension it, said means being so constituted as to vary the said transverse force to subject the material to a substantially constant tension over a predetermined range of movement of the roller and angular displacement of the material from its normal path of travel, means for varying the speed of one of the means for driving the roll stands, and a regulator controlled in accordance with the position of the roller within said predetermined range of movement for controlling the speed varying means, whereby the length of material extending between said roll stands and degree of deflection thereof is so controlled as to maintain said roller within the predetermined range of movement.

16. In combination, a plurality of work devices arranged in spaced relation for simultaneously working a piece of material extending therebetween, means for driving each work device, means positioned intermediate the work devices for subjecting the material to a transverse deflecting force to tension said material and cause it to travel in a path angularly related to its normal straight line path, said force-applying means comprising a first element for engaging the material and a weight-actuated second element for constantly urging the first element against the material inherently adapted to automatically vary the force exerted by the first element as its position changes with variations in the length of material between the work devices within predetermined limits to maintain a substantially constant tension on the material, and regulator means responsive to the movements of the force-applying means within said predetermined limits for controlling the speed of at least one of the driving means to maintain the length of the material between the work devices within said predetermined limits.

17. In combination, a plurality of work devices arranged in spaced relation for simultaneously working a piece of material extending therebetween, means for driving each work device, a weight-actuated pressure roller interposed between the work devices for exerting a transverse deflecting force upon the material to tension the material and cause it to move in an angular path with rspect to its normal path of travel, said pressure roller having a predetermined operating range and being inherently adapted to function within said predetermined operating range to vary the force exerted upon the material in proportion to its degree of angular deflection, and means controlled by the weight-actuated pressure roller for controlling the speed of at least one of the driving means to control the length of material between roll stands and consequently the degree of angular deflection to maintain the weight-actuated pressure roller within its predetermined operating range.

18. The combination with metal working devices adapted for simultaneous operation on a strip of material passing therethrough under tension, of tensioning means positioned intermediate the work devices for subjecting the material to a transverse force deflecting the material out of its normal straight-line path of travel, said means comprising a pivotally-mounted bell-crank lever device having its arms disposed in a predetermined angular relationship and having a pressure roller disposed to engage the material mounted on one arm thereof whereby the transverse deflecting force exerted by the pressure roller is automatically varied in accordance with the degree of deflection of the strip to maintain a substantially constant tension thereon throughout a predetermined range of deflection.

CHARLES P. CROCO.